No. 742,562.  
PATENTED OCT. 27, 1903.  
E. S. BECRAFT.  
DUST CAP FOR VEHICLE WHEELS.  
APPLICATION FILED JULY 25, 1903.  
NO MODEL.

Witnesses  
Inventor  
E. S. Becraft.  
By Hubert D. Lawson  
Attorney.

No. 742,562.

Patented October 27, 1903.

UNITED STATES PATENT OFFICE.

ELI S. BECRAFT, OF IDALIA, MISSOURI, ASSIGNOR OF ONE-HALF TO CHARLES H. BARHAM, OF IDALIA, MISSOURI.

DUST-CAP FOR VEHICLE-WHEELS.

SPECIFICATION forming part of Letters Patent No. 742,562, dated October 27, 1903.

Application filed July 25, 1903. Serial No. 166,954. (No model.)

*To all whom it may concern:*

Be it known that I, ELI S. BECRAFT, a citizen of the United States, residing at Idalia, in the county of Stoddard and State of Missouri, have invented certain new and useful Improvements in Dust-Proof Caps, of which the following is a specification.

My invention relates to new and useful improvements in combined nuts and dust-proof caps for vehicle-wheels; and its object is to provide a simple and inexpensive device of this character which may be readily attached to the hub of a wheel and the cap of which is provided with mechanism for securely locking it to the nut, said mechanism adapted to be operated by means of a suitable key provided therefor.

With the above and other objects in view the invention consists in the novel construction and combination of parts hereinafter more fully described and claimed.

Figure 1:
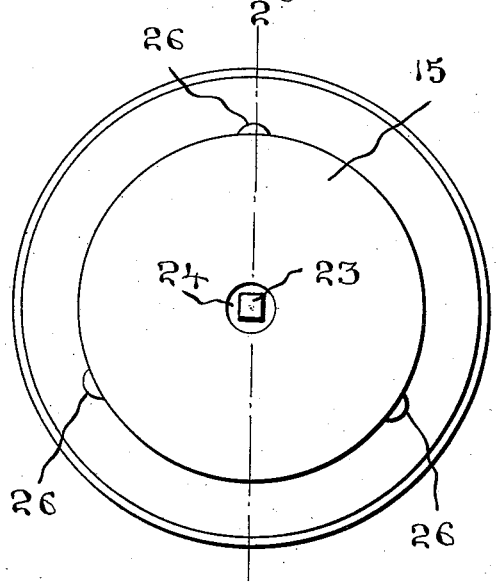
Figure 2:
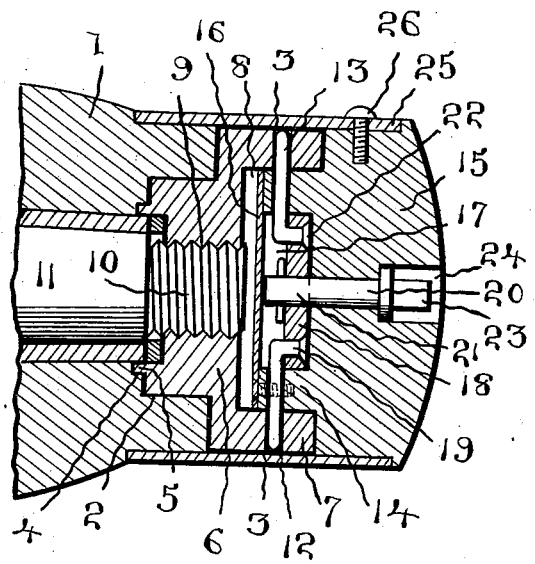
Figure 3:
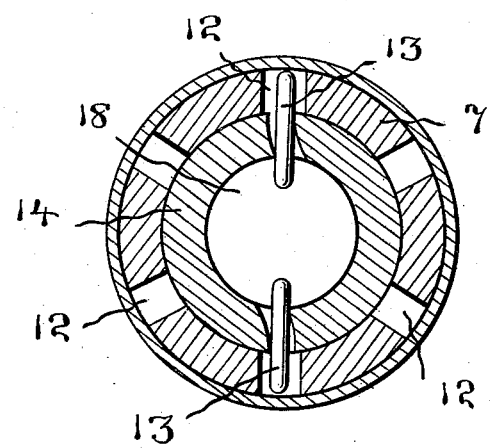
Figure 4:
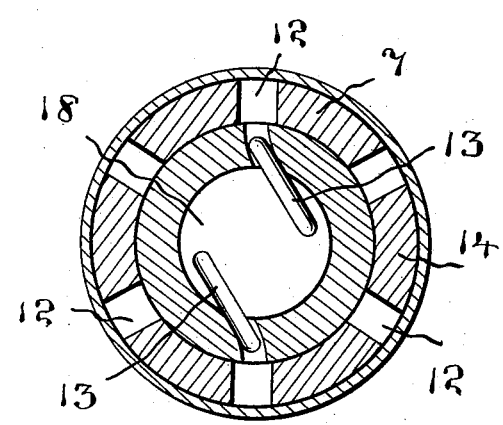

In the drawings, Figure 1 is an end elevation of a wheel-hub having my improved dust-proof cap in position thereon. Fig. 2 is a section on line 2 2, Fig. 1. Fig. 3 is a section on line 3 3, Fig. 2. Fig. 4 is a similar section showing the cap unlocked from the nut.

Referring to the figures by numerals of reference, 1 is a hub having one end recessed, as shown at 2, the bottom of said recess being provided with depressed portions 4 for the reception of lugs 5, which are formed upon the inner face of a nut 6. This nut is preferably cylindrical in form and is adapted to fit within recess 2 and has an enlarged head 7, which is hollow, as shown at 8, and is provided at the center with a screw-threaded passage 9, adapted to receive the threaded end 10 of an axle 11. Laterally-extending passages 12 are formed within the head 7 and are adapted to receive pins 13, which are slidably mounted within a flange 14, formed upon the inner face of a cap 15. A plate 16 is secured, by means of screws or other suitable devices, upon the flange 14, so as to form a compartment 17, within which is arranged a revoluble disk 18, in opposite sides of which is journaled right-angle extensions 19 of the pins 13. A stem 20 is revolubly mounted within and extends longitudinally of the center of cap 15 and has a squared portion 21, which engages the disk 18 and is locked therein by means of a pin 22. The stem 20 has a head 23, which is arranged within a recess 24, formed in the outer face of the cap 15, and is adapted to be engaged by a suitable key (not shown) which is of sufficient size to be inserted in the recess. A sleeve 25 incloses the cap 15 and is secured thereto by means of screws 26 or other suitable devices, and this sleeve is adapted to inclose the head 7 of the nut 6 and also the outer end of hub 1.

When it is desired to remove the parts herein described, the nut 6 is inserted in the recess 2 of hub 1, with the nut 6 in the depressed portions 4. The said hub is then placed upon the axle and turned so as to secure the threaded extension 10 into the passage 9. Cap 15 is then placed against the head 7 of the nut, and the sleeve of said cap is placed over said head and the end of the hub. The flange 14 will, as is obvious, project into the head 7. The cap is turned until the passages in the flange thereof register with passages 12 in the head 7. A key is then inserted into recess 24, and by means thereof stem 20 is rotated, so as to bring the pins into the position illustrated in Fig. 3, where they are shown projected into the passages 12. In order to remove the cap, the operation above described is reversed, and the pins will be retracted, as shown in Fig. 4, thereby permitting the cap to be readily withdrawn.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus fully described the invention, what is claimed as new is—

1. The combination with a hub having a recessed end and provided with depressions; of a nut, lugs upon the nut adapted to engage the depressions, a recessed head to the nut, a cap projecting into the head, and means for locking said cap to the head.

2. The combination with a hub; of a nut projecting thereinto, a recessed head to the nut having passages therein, a cap, a sleeve extending from the cap and inclosing the nut, a flange to the cap projecting into the head, and means mounted within the flange for locking the cap to the nut.

3. The combination with a hub having a recessed end; of a nut seated within said end, a head to the nut having a recess therein, a cap, a sleeve extending from the cap and inclosing the nut and one end of the hub, a flange upon the cap and projecting into the head, a revoluble disk inclosed thereby, pins engaging the disk and slidably mounted within the flange, and means for rotating the disk and projecting the pins.

4. The combination with a hub having a recessed end; of a nut seated in said end, a head to the nut having a recess in its outer face, said head having passages extending therethrough, a cap, a sleeve extending from the cap and inclosing the nut and one end of the hub, a stem revolubly mounted within the cap, a disk revoluble therewith, a flange upon the cap inclosing the disk, pins pivotally connected to opposite sides of the disk and slidably mounted within the flange, and a plate secured to the flange.

In testimony whereof I affix my signature in presence of two witnesses.

ELI S. ✕ BECRAFT.
his mark

Witnesses:
J. M. WALKER,
R. E. BAILEY.